US012483823B2

(12) United States Patent
Ren et al.

(10) Patent No.: US 12,483,823 B2
(45) Date of Patent: Nov. 25, 2025

(54) SOUND-GENERATING DEVICE

(71) Applicant: AAC Microtech (Changzhou) Co., Ltd., Jiangsu (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 222 days.

(21) Appl. No.: 18/536,276

(22) Filed: Dec. 12, 2023

(65) Prior Publication Data

US 2025/0133332 A1 Apr. 24, 2025

Related U.S. Application Data

(63) Continuation of application No. PCT/CN2023/125226, filed on Oct. 18, 2023.

(51) Int. Cl.

| | |
|---|---|
| ***H04R 1/24*** | (2006.01) |
| ***H04R 7/04*** | (2006.01) |
| ***H04R 7/18*** | (2006.01) |
| ***H04R 9/02*** | (2006.01) |
| ***H04R 9/06*** | (2006.01) |

(52) U.S. Cl.

CPC ................. *H04R 1/24* (2013.01); *H04R 7/04* (2013.01); *H04R 7/18* (2013.01); *H04R 9/025* (2013.01); *H04R 9/06* (2013.01); *H04R 2400/11* (2013.01)

(58) Field of Classification Search

None

See application file for complete search history.

(56) References Cited

U.S. PATENT DOCUMENTS 4,357,498 A * 11/1982 Tsuchiya ................ H04R 9/063 381/186

2010/0215208 A1* 8/2010 Sadaie .................. H04R 1/227 381/407

* cited by examiner

*Primary Examiner* — Walter F Briney, III

(74) *Attorney, Agent, or Firm* — Wiersch Law Group

(57) ABSTRACT

A sound-generating device, including a bass cone frame, a bass vibration system, a bass magnetic circuit system, a treble cone frame, a treble vibration system, a treble magnetic circuit system and a conductive component. The treble vibration system includes a treble diaphragm and a treble voice coil. The bass magnetic circuit system includes a bass bottom plate and a first bass primary magnet. The treble magnetic circuit system includes a pole core, a first ring magnet and a second ring magnet both in a ring shape. The pole core includes a pole core body and a pole core wall. The first ring magnet is stackedly fixed to a side of the first bass primary magnet away from the bass bottom plate, and is located at an inner side of the pole core wall. The first ring magnet surrounds the conductive component, and is spaced from the conductive component.

10 Claims, 7 Drawing Sheets

A-A

B-B

SOUND-GENERATING DEVICE

CROSS-REFERENCE TO RELATED APPLICATIONS

This application is a continuation of International Patent Application No. PCT/CN2023/125226, filed on Oct. 18, 2023. The content of the aforementioned application, including any intervening amendments made thereto, is incorporated herein by reference in its entirety.

TECHNICAL FIELD

The present application relates to electro-acoustic conversion, and more particularly to a sound-generating device.

BACKGROUND

Sound-generating device is a transducing device that converts an electrical signal into an acoustic signal, which mainly includes a cone frame, a vibration system fixed to the cone frame, a magnetic circuit system fixed to the cone frame and configured to drive the vibration system to vibrate, and a conductive component. The vibration system includes a diaphragm and a voice coil that drives the vibration of the diaphragm. The magnetic circuit system mainly includes a bottom plate and a magnet fixed to the bottom plate. The conductive component runs through the magnetic circuit system from the bottom, and extends to a position below the diaphragm to be electrically connected to the voice coil. In order to arrive at an enhanced acoustic performance, a large-size full-range coaxial sound-generating device integrating a bass section and a treble section has been designed.

The existing large-size full-range coaxial sound-generating devices mainly includes a bass cone frame, a bass vibration system fixed to the bass cone frame, a bass magnetic circuit system fixed to the bass cone frame and configured to drive the vibration of the bass vibration system, a treble cone frame, a treble vibration system fixed to the treble cone frame, a treble magnetic circuit system fixed to the treble cone frame and configured to drive the vibration of the treble vibration system, and a conductive component. The treble magnetic circuit system mainly includes a treble bottom plate (pole core) in a ring shape, a protruding portion bending and extending from an inner periphery of the treble bottom plate toward the treble vibration system, and a ring magnet provided around the protruding portion and spaced from the protruding portion to form a treble magnetic gap. A treble voice coil of the treble vibration system is insertedly suspended in the treble magnetic gap. The conductive component runs through the bass magnetic circuit system and the treble top plate in sequence from the bottom of the bass magnetic circuit system, and extends to a position below the treble diaphragm to be electrically connected to the treble voice coil.

In order to facilitate the installation of the large-size full-range coaxial sound-generating device, the space of the internal structure is often designed to be relatively large, but in the related technology of large-size full-range coaxial sound-generating devices, the installation space of the conductive component is only reserved below the protruding portion, resulting in the waste of a large amount of space.

Therefore, it is necessary to provide a novel sound-generating device to solve the above technical problems.

SUMMARY

An object of the present application is to provide a sound-generating device to overcome the technical problem in the existing large-size full-range coaxial sound-generating devices that the installation space of the conductive component is only reserved below the protruding portion, which results in the waste of a large amount of space.

Technical solutions of this application will be specifically described below.

This application provides a sound-generating device, comprising:

a bass cone frame;

a bass vibration system fixed to the bass cone frame;

a bass magnetic circuit system fixed to the bass cone frame and configured to drive the bass vibration system to vibrate;

a treble cone frame;

a treble vibration system fixed to the treble cone frame; and a treble magnetic circuit system fixed to the treble cone frame and configured to drive the treble vibration system to vibrate;

wherein the bass magnetic circuit system comprises a bass bottom plate and a first bass primary magnet stackedly fixed to a side of the bass bottom plate close to the bass vibration system; and the treble vibration system comprises a treble diaphragm fixed to the treble cone frame and a treble voice coil configured to drive the treble diaphragm to vibrate;

the treble magnetic circuit system comprises a pole core, a first ring magnet in a ring shape and a second ring magnet in a ring shape; the pole core comprises a pole core body and a pole core wall; the pole core body has a ring shape, and is stackedly fixed to a side of the first bass primary magnet away from the bass bottom plate; the pole core wall has a ring shape, and is configured to bend and extend from an inner periphery of the pole core body toward the treble diaphragm; the first ring magnet is stackedly fixed to the side of the first bass primary magnet away from the bass bottom plate, and is located at an inner side of the pole core wall; the second ring magnet is stackedly fixed to the pole core body; the second ring magnet is provided around the pole core wall, and is spaced from the pole core wall to form a treble magnetic gap; the treble cone frame is fixed to a side of the second ring magnet away from the pole core body; and the treble voice coil is insertedly suspended in the treble magnetic gap; and the sound-generating device further comprises a conductive component; the conductive component is configured to run through the bass top plate, the first bass primary magnet and the pole core in sequence from a bottom of the bass magnetic circuit system, and extend to a position below the treble diaphragm to be electrically connected to the treble voice coil; and the first ring magnet is provided around the conductive component, and is spaced from the conductive component.

In some embodiments, the pole core further comprises a pole core plate provided at a top of the pole core wall; and the conductive component extends through the pole core plate to the position below the treble diaphragm.

In some embodiments, the treble magnetic circuit system further comprises a treble top plate stackedly fixed to the side of the second ring magnet away from the pole core body; and the treble top plate abuts against an inner periphery of the treble cone frame.

In some embodiments, a side of the bass magnetic circuit system close to the bass vibration system is provided with a first bass magnetic gap, a second bass magnetic gap and a third bass magnetic gap spaced apart from each other; the first bass magnetic gap is provided around the treble magnetic gap and the first bass primary magnet; the second bass magnetic gap and the third bass magnetic gap are located on opposite sides of the first bass magnetic gap, respectively; the bass vibration system comprises a bass diaphragm fixed to the bass cone frame, a first bass voice coil, a second bass voice coil and a third bass voice coil; the first bass voice coil, the second bass voice coil and the third bass voice coil are spaced apart from each other, and are configured to drive the bass diaphragm to vibrate; the first bass voice coil is insertedly suspended in the first bass magnetic gap; the second bass voice coil is insertedly suspended in the second bass magnetic gap; and the third bass voice coil is insertedly suspended in the third bass magnetic gap.

In some embodiments, the bass diaphragm comprises a first surround in a ring shape, a second surround in a ring shape and a vibration portion in a ring shape; the second surround is arranged spaced apart at an inner side of the first surround; an outer periphery of the first surround is fixed to the bass cone frame; an inner periphery of the second surround is fixed to the second ring magnet; an outer periphery of the vibration portion is fixed to an inner periphery of the first surround; an inner periphery of the vibration portion is fixed to an outer periphery of the second surround; and the first bass voice coil, the second bass voice coil and the third bass voice coil are fixed to a side of the vibration portion close to the bass magnetic circuit system.

In some embodiments, the bass diaphragm further comprises a dome stackedly fixed to a side of the vibration portion away from the bass magnetic circuit system.

In some embodiments, the bass vibration system further comprises an elastic member; one end of the elastic member is fixed to the bass cone frame, and the other end of the elastic member is fixed to a side of the vibration portion close to the bass magnetic circuit system; and the first bass voice coil, the second bass voice coil and the third bass voice coil are fixed to a side of the elastic member away from the vibration portion.

In some embodiments, the bass magnetic circuit system further comprises a second bass primary magnet, a third bass primary magnet, a plurality of first bass secondary magnets, a plurality of second bass secondary magnets and a plurality of third bass secondary magnets; the second bass primary magnet and the third bass primary magnet are stackedly fixed to the side of the bass bottom plate close to the bass vibration system, and are located at opposite sides of the first bass primary magnet, respectively; the plurality of first bass secondary magnets are provided around the first bass primary magnet; the plurality of second bass secondary magnets are provided around the second bass primary magnet; the plurality of third bass secondary magnets are provided around the third bass primary magnet; the second bass primary magnet and the third bass primary magnet are spaced from the first bass primary magnet; the plurality of first bass secondary magnets are spaced from the first bass primary magnet to form the first bass magnetic gap; the plurality of second bass secondary magnets and some of the plurality of first bass secondary magnets are spaced from the second bass primary magnet to form the second bass magnetic gap; and the plurality of third bass secondary magnets and some of the plurality of first bass secondary magnets are spaced from the third bass primary magnet to form the third bass magnetic gap.

In some embodiments, the bass magnetic circuit system further comprises a bass top plate; the bass top plate is stackedly fixed to a side of the plurality of first bass secondary magnets close to the bass vibration system, a side of the plurality of second bass secondary magnets close to the bass vibration system and a side of the plurality of third bass secondary magnets close to the bass vibration system.

In some embodiments, the bass magnetic circuit system further comprises a bass pole core; and the bass pole core is fixed to a side of the second bass primary magnet close to the bass vibration system and a side of the third bass primary magnet close to the bass vibration system.

Compared to the prior art, this application has the following beneficial effects.

Regarding the sound-generating device provided herein, a first ring magnet is introduced, and is stackedly fixed to a side of the first bass primary magnet away from the bass bottom plate and located an inner side of the pole core wall. Moreover, the first ring magnet is configured to surround the conductive component and be spaced from the conductive component, such that the overall BL value is improved by utilizing the extra space of the sound-generating device and the first ring magnet, thereby avoiding the waste of space.

BRIEF DESCRIPTION OF THE DRAWINGS

In order to illustrate the technical solutions in the embodiments of the present application more clearly, the drawings needed in the description of embodiments of the present application will be briefly described below. Obviously, presented in the drawings are merely some embodiments of this application, which are not intended to limit this application. For those skilled in the art, other drawings can be obtained based on the drawings provided herein without making creative effort.

Figure 1:
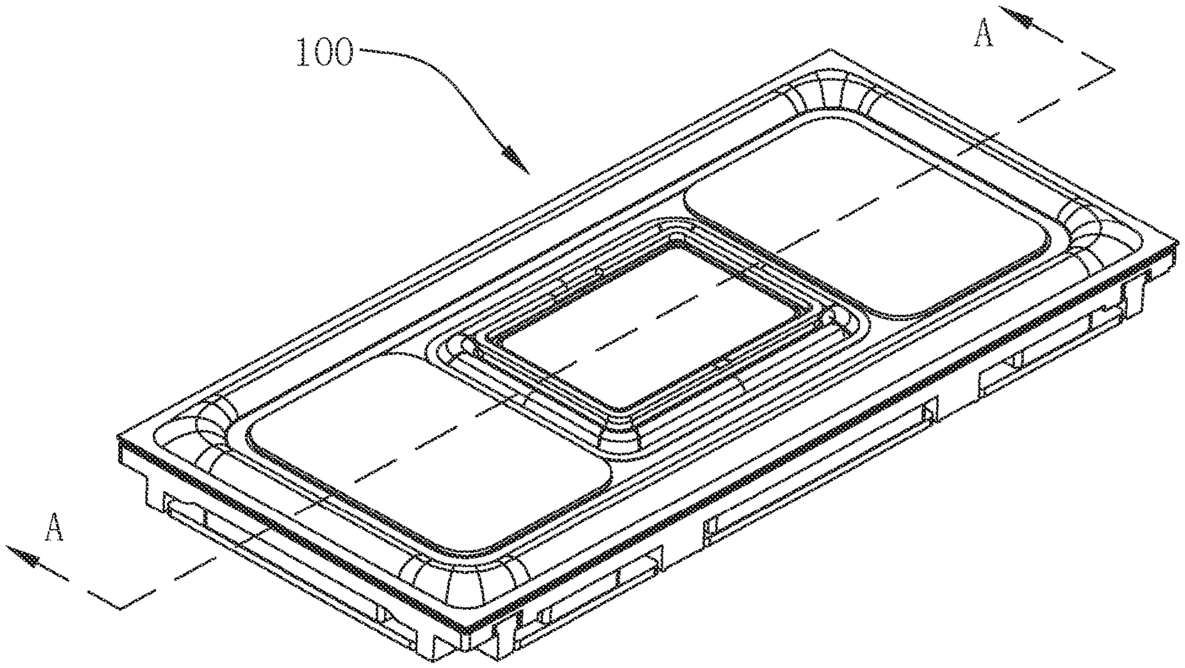
FIG. 1 is a perspective view of a first sound-generating device according to an embodiment of the present disclosure.

In the drawings: 100, sound-generating device; 1, bass cone frame; 2, bass vibration system; 21, bass diaphragm; 211, first surround; 212, second surround; 213, vibration portion; 214, dome; 22, second bass voice coil; 23, first bass voice coil; 24, third bass voice coil; 25, elastic member; 3, bass magnetic circuit system; 31, bass bottom plate; 32, first bass primary magnet; 33, second bass primary magnet; 34, third bass primary magnet; 35, second bass secondary magnet; 36, first bass secondary magnet; 37, third bass secondary magnet; 38, bass top plate; 39, bass pole core; 4, treble cone frame; 5, treble vibration system; 51, treble diaphragm; 52, treble voice coil; 6, treble magnetic circuit system; 61, pole core; 611, pole core body; 612, pole core wall; 613, pole core plate; 62, first ring magnet; 63, second ring magnet; 64, treble top plate; 7, conductive component; 10, treble magnetic gap; 20, first bass magnetic gap; 30, second bass magnetic gap; and 40, third bass magnetic gap.

DETAILED DESCRIPTION OF THE EMBODIMENTS

Unless otherwise defined, all technical and scientific terms used herein have the same meanings as those are commonly understood by those skilled in the art to which this application belongs. The terms used herein are used only for the purpose of describing specific embodiments and are not intended to limit the application. The terms "comprising" and "having" and any variations thereof in the specification and claims of this application and in the foregoing description of the accompanying drawings are intended to cover non-exclusive inclusion. The terms "first", "second", etc., in the specification and claims of this application or in the description of drawings are used to distinguish between different objects, rather than indicating a particular order.

The reference to "embodiment(s)" herein indicates that particular features, structures, or characteristics described in conjunction with embodiments may be included in at least one embodiment of the present application. The presence of the phrase in the specification does not necessarily refer to the same embodiment, nor is it a separate or alternative embodiment that is mutually exclusive of other embodiments. It is understood by those skilled in the art, both explicitly and implicitly, that the embodiments described herein may be combined with other embodiments.

It should be noted that the orientation and position relationship described with reference to terms "upper", "lower", "left", "right" and the like is based on the orientation and position relationship shown in the drawings, and thus these terms should not be construed as limitation to the disclosure. It should also be understood that, as used herein, the term "above" or "below" indicates that an element is directly "above" or "below" another element, or "above" or "below" another element through an intermediate element.

The present application will be described clearly and completely below with reference to the accompanying drawings and embodiments to make objects, technical solutions, and advantages of the present application clearer and better understood. It should be understood that described below are merely some embodiments of the present application, and are not intended to limit the present application. Other embodiments obtained by those skilled in the art based on the content disclosed herein without making creative effort should fall within the scope of the present application.

Referring to an embodiment in FIGS. 1-7, a sound-generating device 100 is provided, which includes a bass cone frame 1, a bass vibration system 2 fixed to the bass cone frame 1, a bass magnetic circuit system 3 fixed to the bass cone frame 1 and configured to drive the bass vibration system 2 to vibrate, a treble cone frame 4, a treble vibration system 5 fixed to the treble cone frame 4 and a treble magnetic circuit system 6 fixed to the treble cone frame 4 and configured to drive the treble vibration system 5 to vibrate. The sound-generating device 100 further includes a conductive component 7.

Specifically, a side of the bass magnetic circuit system 3 close to the bass vibration system 2 is provided with a first bass magnetic gap 20, a second bass magnetic gap 30 and a third bass magnetic gap 40 spaced apart from each other. The first bass magnetic gap 20 is provided around a treble magnetic gap 10. The second bass magnetic gap 30 and the third bass magnetic gap 40 are located on opposite sides of the first bass magnetic gap 20, respectively. The bass vibration system 2 includes a bass diaphragm 21 fixed to the bass cone frame 1, a first bass voice coil 23, a second bass voice coil 22 and a third bass voice coil 24. The first bass voice coil 23, the second bass voice coil 22 and the third bass voice coil 24 are spaced apart from each other, and are configured to drive the bass diaphragm 21 to vibrate. The first bass voice coil 23 is insertedly suspended in the first bass magnetic gap 20. The second bass voice coil 22 is insertedly suspended in the second bass magnetic gap 30. The third bass voice coil 24 is insertedly suspended in the third bass magnetic gap 40. Three bass voice coils connected in series are arranged at the bass portion, such that the bass vibration system can be supported more evenly.

The bass diaphragm 21 includes a first surround 211 in a ring shape, a second surround 212 in a ring shape and a vibration portion 213 in a ring shape. The second surround 212 is arranged spaced apart at an inner side of the first surround 211. An outer periphery of the first surround 211 is fixed to the bass cone frame 1. An inner periphery of the second surround 212 is fixed to a second ring magnet 63. An outer periphery of the vibration portion 213 is fixed to an inner periphery of the first surround 211. An inner periphery of the vibration portion 213 is fixed to an outer periphery of the second surround 212. The first bass voice coil 23, the second bass voice coil 22 and the third bass voice coil 24 are fixed to a side of the vibration portion 213 close to the bass magnetic circuit system 3.

The bass diaphragm 21 further includes a dome stackedly fixed to a side of the vibration portion 213 away from the bass magnetic circuit system 3. In this embodiment, two domes 214 are provided spaced apart from each other, and located at two sides of the treble vibration system 5, respectively.

Specifically, the bass vibration system 2 further includes an elastic member 25. One end of the elastic member 25 is fixed to the bass cone frame 1, and the other end of the elastic member 25 is fixed to a side of the vibration portion 213 close to the bass magnetic circuit system 3. The first bass voice coil 23, the second bass voice coil 22 and the third bass voice coil 24 are fixed to a side of the elastic member 25 away from the vibration portion 213.

Specifically, the bass magnetic circuit system 3 further includes a bass bottom plate 31, a first bass primary magnet 32, a second bass primary magnet 33, a third bass primary magnet 34, a plurality of first bass secondary magnets 36 surrounding the first bass primary magnet 32, a plurality of second bass secondary magnets 35 surrounding the second bass primary magnet 32, and a plurality of third bass secondary magnets 36 surrounding the third bass primary magnet 34. The first bass primary magnet 32, the second bass primary magnet 33 and the third bass primary magnet 34 are stackedly fixed to a side of the bass bottom plate 31 close to the bass vibration system 2, and are arranged spaced apart in sequence. The plurality of first bass secondary magnets 36 are spaced from the first bass primary magnet 32 to form the first bass magnetic gap 20. The plurality of second bass secondary magnets 35 and some of the plurality of first bass secondary magnets 36 are spaced from the second bass primary magnet 33 to form the second bass magnetic gap 30. The plurality of third bass secondary magnets 37 and some of the plurality of first bass secondary magnets 36 are spaced from the third bass primary magnet 34 to form the third bass magnetic gap 40.

The second bass primary magnet 33 and the third bass primary magnet 34 are spaced from the first bass primary magnet 32, and are located at opposite sides of the first bass primary magnet 32, respectively. The plurality of first bass secondary magnets 36, the plurality of second bass secondary magnets 35 and the plurality of third bass secondary magnets 37 are stackedly fixed to a side of the bass bottom plate 31 close to the bass vibration system 2.

In this embodiment, the number of the plurality of first bass secondary magnets 36 is four, and four first bass secondary magnets 36 are respectively arranged at four sides of the first bass primary magnet 32, namely, the first bass primary magnet 32 has a rectangular structure. The number of the plurality of second bass secondary magnets 35 is three, and three second bass secondary magnets 35 are respectively arranged at three sides of the second bass primary magnet 33 that are not close to the first bass primary magnet 32, namely, the second bass primary magnet 33 has a rectangular structure. The three second bass secondary magnets 35 and one of the four first bass secondary magnets 36 close to the second bass primary magnet 33 are spaced from the second bass primary magnet 33 to form the second bass magnetic gap 30. The number of the plurality of third bass secondary magnets 37 is three, and three third bass secondary magnets are respectively arranged at three sides of the third bass primary magnet 34 that are not close to the first bass primary magnet 32, namely, the third bass primary magnet 34 has a rectangular structure. The three third bass secondary magnets 37 and one of the four first bass secondary magnets 36 close to the third bass primary magnet 34 are spaced from the third bass primary magnet 34 to form the third bass magnetic gap 40.

Specifically, the bass magnetic circuit system 3 further includes a bass top plate 38, which is stackedly fixed to a side of the plurality of first bass secondary magnets 36 close to the bass vibration system 2, a side of the plurality of second bass secondary magnets 35 close to the bass vibration system 2 and a side of the plurality of third bass secondary magnets 37 close to the bass vibration system 2.

In this embodiment, the number of the bass top plate 38 is three, respectively a first bass top plate **38*a*, a second bass top plate 38*b* and a third bass top plate 38*c*. The first bass top plate 38*a* has a ring-shaped structure, and is fixed to the bass cone frame 1. Moreover, the first bass top plate 38*a* is also stackedly fixed to the first bass secondary magnet 36, the second bass secondary magnet 35 and the third bass secondary magnet 37 at a periphery of the bass bottom plate 31. The second bass top plate 38*b* and the third bass top plate 38*c* are stackedly fixed to two first bass secondary magnets 36 at a middle of the bass bottom plate 31**, respectively.

Specifically, the bass magnetic circuit system 3 further includes two bass pole cores 39, respectively a first bass pole core **39*a* and a second bass pole core 39*b*. The two bass pole cores 39 are respectively fixed to a side of the second bass primary magnet 33 close to the bass vibration system 2 and a side of the third bass primary magnet 34 close to the bass vibration system 2, that is, the first bass pole core 39*a* is fixed to the side of the second bass primary magnet 33 close to the bass vibration system 2, and the second bass pole core 39*b* is fixed to the side of the third bass primary magnet 34 close to the bass vibration system 2**.

Specifically, the treble vibration system 5 includes a treble diaphragm 51 fixed to the treble cone frame 4 and a treble voice coil 52 configured to drive the treble diaphragm 51 to vibrate.

Specifically, the treble magnetic circuit system 6 includes a pole core 61, a first ring magnet 62 in a ring shape and a second ring magnet 63 in a ring shape. The pole core 61 includes a pole core body 611, a pole core wall 612 and a pole core plate 613. The pole core body 611 has a ring shape, and is stackedly fixed to a top of the bass magnetic circuit system 3. The pole core wall 612 has a ring shape, and is configured to bend and extend from an inner periphery of the pole core body 611 toward the treble diaphragm 51. The pole core plate 613 is provided at a top of the pole core wall 612. The first ring magnet 62 is stackedly fixed to the top of the bass magnetic circuit system 3, and is located at an inner side of the pole core wall 612. The second ring magnet 63 is stackedly fixed to the pole core body 611. The second ring magnet 63 is provided around the pole core wall 612, and is spaced from the pole core wall 612 to form a treble magnetic gap 10. The treble cone frame 4 is fixed to a side of the second ring magnet 63 away from the pole core body 611. The treble voice coil 52 is insertedly suspended in the treble magnetic gap 10.

Figure 2:
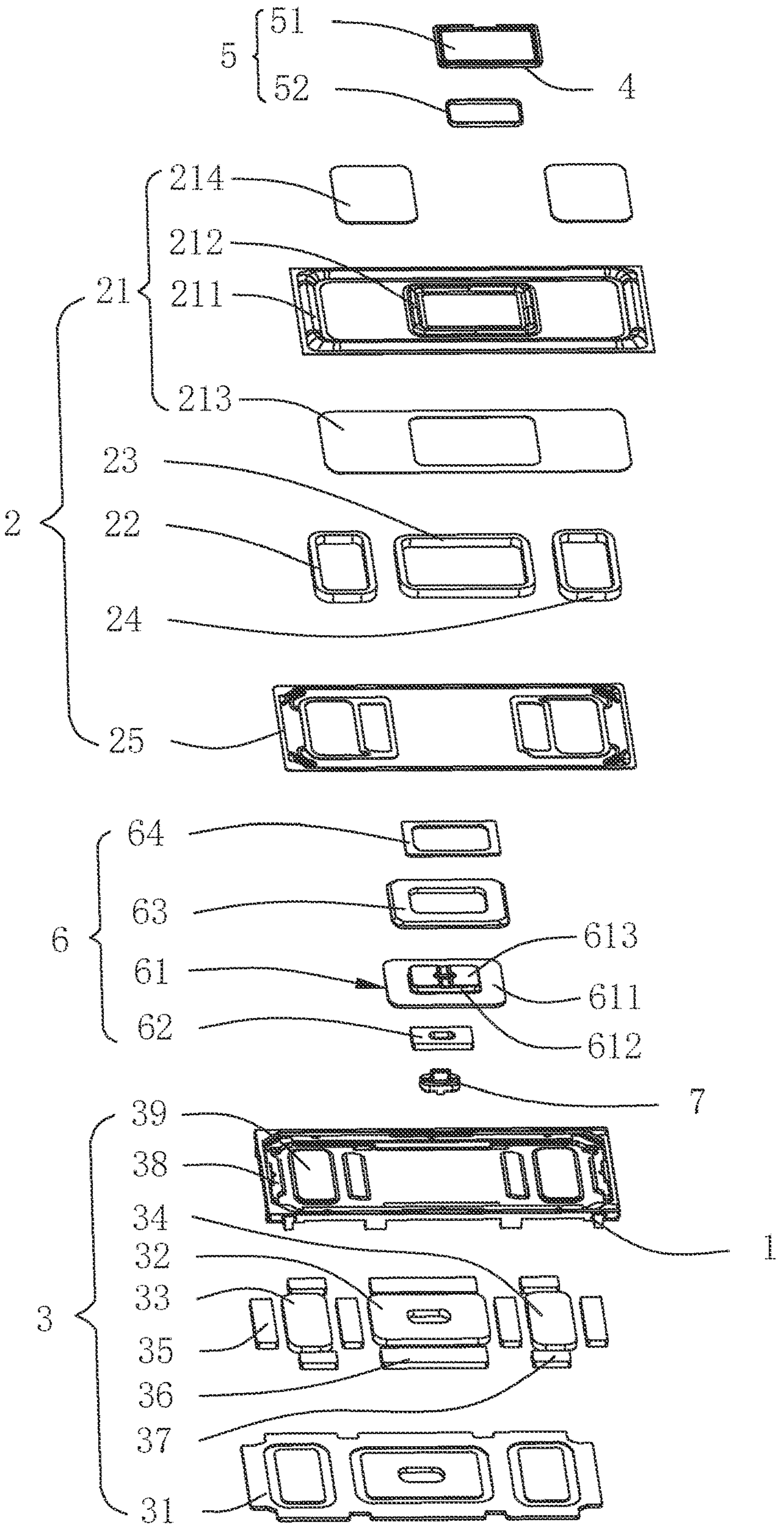
FIG. 2 is an exploded view of the first sound-generating device according to an embodiment of the present disclosure.
Figure 3:
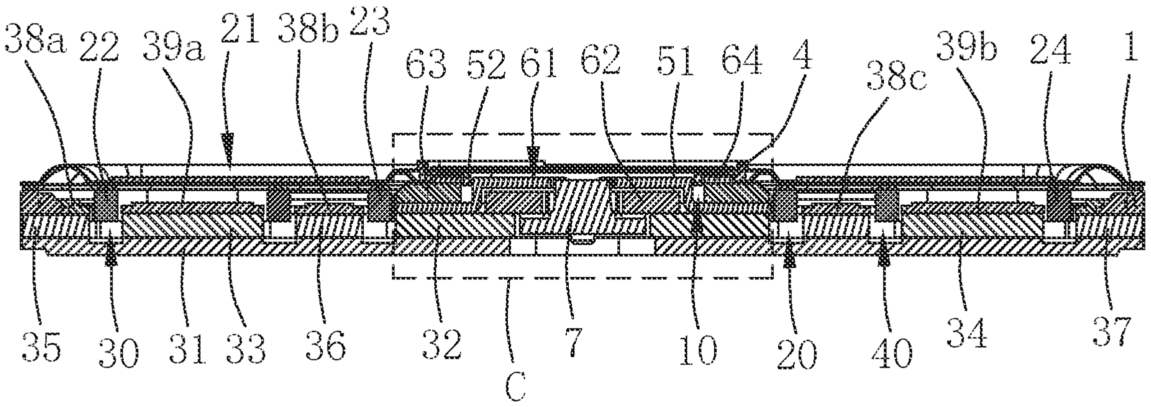
FIG. 3 is a sectional view of the first sound-generating device in FIG. 1 along A-A line.
Figure 4:
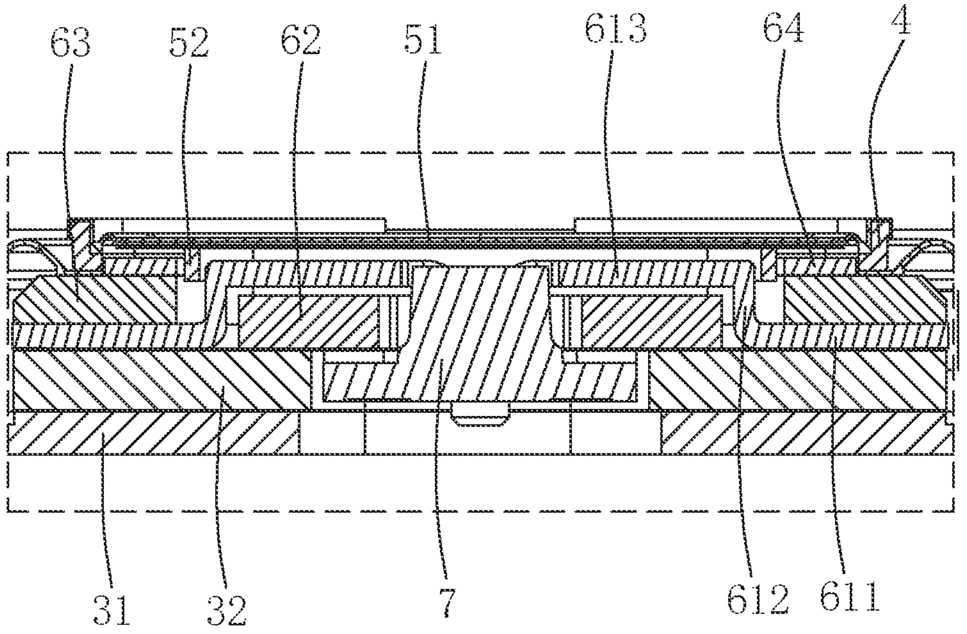
FIG. 4 is an enlarged view of part "C" in FIG. 3.
Figure 5:
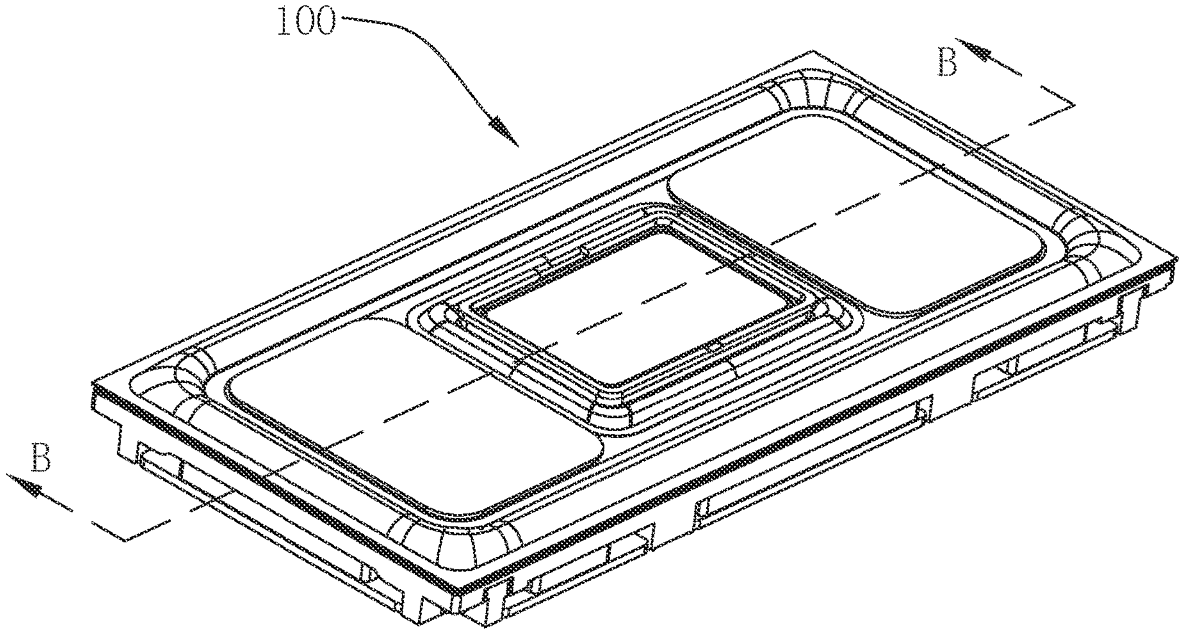
FIG. 5 is a perspective view of a second sound-generating device according to an embodiment of the present disclosure.

The pole core body 611 and the first ring magnet 62 are stackedly fixed to a side of the first bass primary magnet 32 close to the bass vibration system 2. The pole core plate 613 is arranged according to the actual needs. As shown in FIG. 2, the pole core 61 is provided with the pole core plate 613, while in FIG. 6, the pole core plate 613 is absent.

The first ring magnet 62 is also spaced from the pole core wall 612 and the pole core plate 613. The first ring magnet 62 is configured to be magnetized along a vibration direction of the treble diaphragm 51 in the treble vibration system 5 or a vibration direction of the bass diaphragm 21 in the bass vibration system 2, and can also be magnetized along a radial direction (a direction perpendicular to the vibration direction of the treble diaphragm 51 or the bass diaphragm 21).

Figure 6:
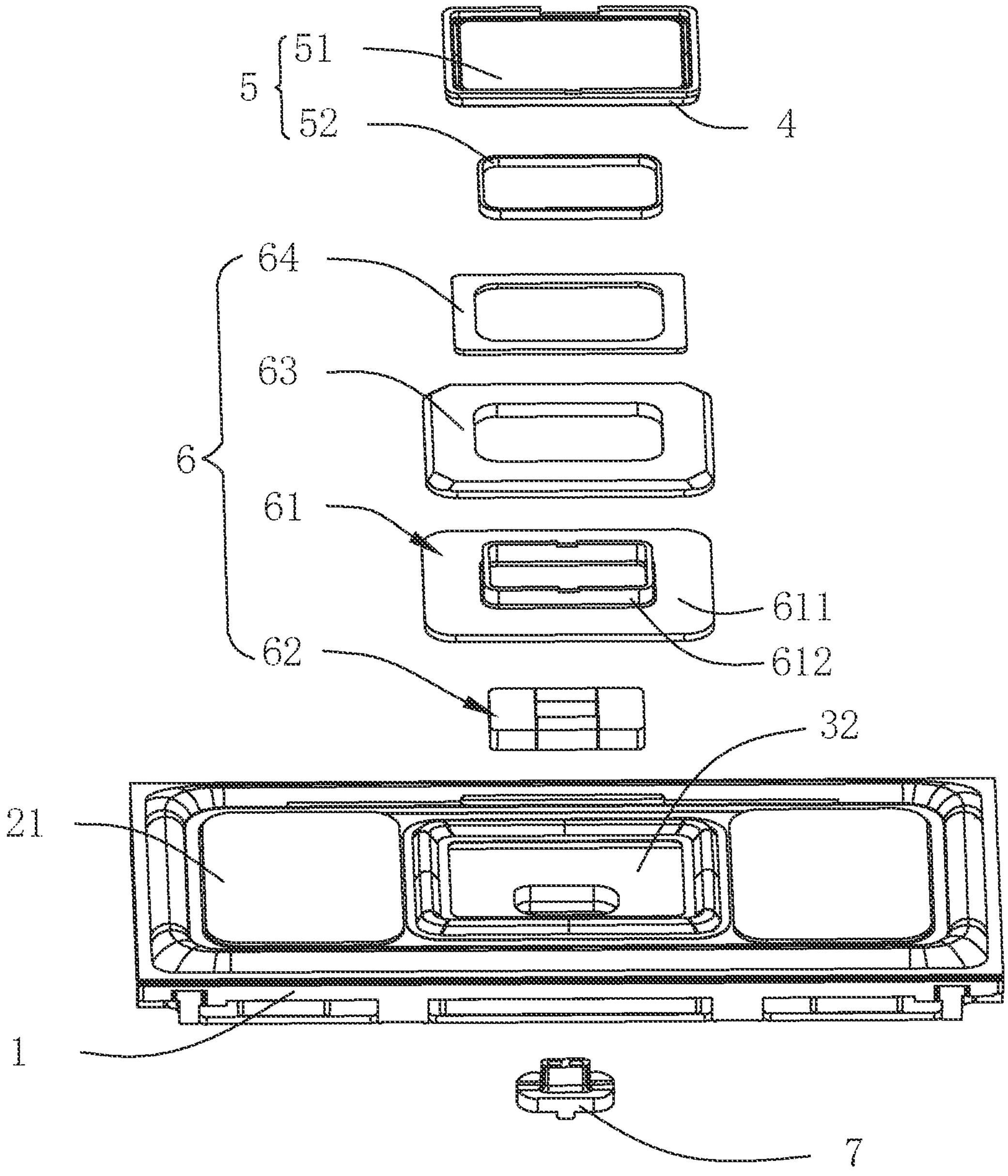
FIG. 6 is a partial exploded view of the second sound-generating device according to an embodiment of the present disclosure.
Figure 7:
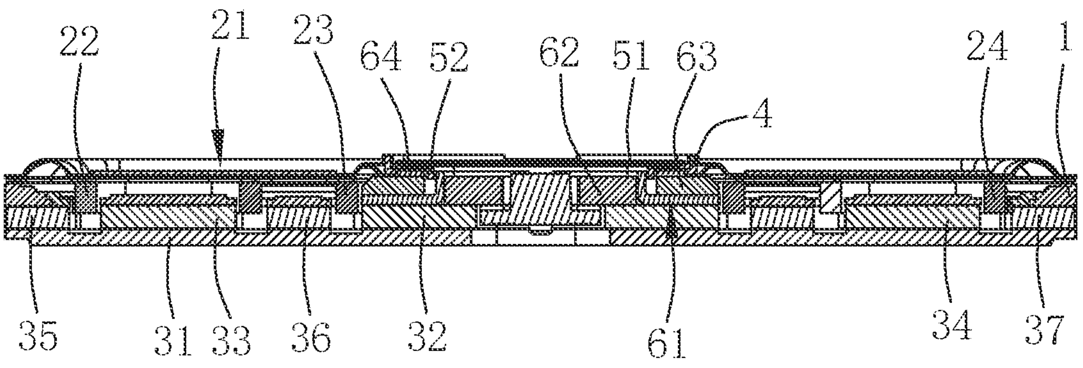
FIG. 7 is a sectional view of the second sound-generating device in FIG. 5 along B-B line.

As shown in FIG. 2, the first ring magnet 62 has an integral ring-shaped structure. As shown in FIG. 6, the first ring magnet 62 is composed of four magnets, which are arranged around the pole core wall 612 to form a ring-shaped structure, that is, the pole core wall 612 is rectangular, and the four magnets are respectively arranged at four sides of the pole core wall 612.

In this embodiment, the treble magnetic circuit system 6 further includes a treble top plate 64 stackedly fixed to a side of the second ring magnet 63 away from the pole core body 611. The treble top plate 64 abuts against an inner periphery of the treble cone frame 4. The treble top plate 64 is spaced from the treble diaphragm 51.

Specifically, the conductive component 7 runs through the bass magnetic circuit system 3 and the pole core plate 613 in sequence from a bottom of the bass magnetic circuit system 3, and extends to a position below the treble diaphragm 51 to be electrically connected to the treble voice coil 52. The first ring magnet 62 is arranged around the conductive component 7, and is spaced from the conductive component 7.

The conductive component 7 runs through the bass bottom plate 31 and the first bass primary magnet 32 of the bass magnetic circuit system 3 in sequence.

In the sound-generating device 100 provided in this embodiment, magnetization directions of the first bass primary magnet 32, the second bass primary magnet 33, the third bass primary magnet 34, the first bass secondary magnets 36, the second bass secondary magnets 35, the third bass secondary magnets 37 and the second ring magnet 63 are configured to be along a vibration direction of the treble diaphragm 51 or the bass diaphragm 21. The first bass primary magnet 32, the second bass primary magnet 33, the third bass primary magnet 34 and the second ring magnet 63 are the same in magnetization direction, and a magnetization direction of the first bass primary magnet 32 is opposite to magnetization directions of the first bass secondary magnets 36, the second bass secondary magnets 35 and the third bass secondary magnets 37. If the magnetization direction of the first ring magnet 62 is along the vibration direction of the treble diaphragm 51 or the bass diaphragm 21, its magnetization direction is the same as the magnetization direction of the first bass primary magnet 32.

Regarding the sound-generating device 100 provided herein, the first ring magnet 62 is introduced, and is stackedly fixed to the side of the first bass primary magnet 32 away from the bass bottom plate 31 and located an inner side of the pole core wall 612. Moreover, the first ring magnet 62 is configured to surround the conductive component 7 and be spaced from the conductive component 7, such that the overall BL value is improved by utilizing the extra space of the sound-generating device 100 and the first ring magnet 62, thereby avoiding the waste of space.

The foregoing description of the disclosed embodiments enables those of ordinary skill in the art to implement or use the technical solutions of this application, and is not intended to limit the present application. It should be understood that any variations, replacements and modifications made by those of ordinary skill in the art without departing from the spirit and scope of the present application shall fall within the scope of the present application defined by the appended claims. Unless otherwise defined, words appearing in the singular form include the plural form and vice versa. Also, unless specifically stated, all or part of any embodiment may be used in conjunction with all or part of any other embodiment.

What is claimed is:

1. A sound-generating device, comprising:

a bass cone frame;

a bass vibration system fixed to the bass cone frame;

a bass magnetic circuit system fixed to the bass cone frame and configured to drive the bass vibration system to vibrate;

a treble cone frame;

a treble vibration system fixed to the treble cone frame; and a treble magnetic circuit system fixed to the treble cone frame and configured to drive the treble vibration system to vibrate;

wherein the bass magnetic circuit system comprises a bass bottom plate and a first bass primary magnet stackedly fixed to a side of the bass bottom plate close to the bass vibration system; and the treble vibration system comprises a treble diaphragm fixed to the treble cone frame and a treble voice coil configured to drive the treble diaphragm to vibrate;

the treble magnetic circuit system comprises a pole core, a first ring magnet in a ring shape and a second ring magnet in a ring shape; the pole core comprises a pole core body and a pole core wall; the pole core body has a ring shape, and is stackedly fixed to a side of the first bass primary magnet away from the bass bottom plate; the pole core wall has a ring shape, and is configured to bend and extend from an inner periphery of the pole core body toward the treble diaphragm; the first ring magnet is stackedly fixed to the side of the first bass primary magnet away from the bass bottom plate, and is located at an inner side of the pole core wall; the second ring magnet is stackedly fixed to the pole core body; the second ring magnet is provided around the pole core wall, and is spaced from the pole core wall to form a treble magnetic gap; the treble cone frame is fixed to a side of the second ring magnet away from the pole core body; and the treble voice coil is insertedly suspended in the treble magnetic gap; and the sound-generating device further comprises a conductive component; the conductive component is configured to run through the bass top plate, the first bass primary magnet and the pole core in sequence from a bottom of the bass magnetic circuit system, and extend to a position below the treble diaphragm to be electrically connected to the treble voice coil; and the first ring magnet is provided around the conductive component, and is spaced from the conductive component.

2. The sound-generating device of claim 1, wherein the pole core further comprises a pole core plate provided at a top of the pole core wall; and the conductive component extends through the pole core plate to the position below the treble diaphragm.

3. The sound-generating device of claim 1, wherein the treble magnetic circuit system further comprises a treble top plate stackedly fixed to the side of the second ring magnet away from the pole core body; and the treble top plate abuts against an inner periphery of the treble cone frame.

4. The sound-generating device of claim 1, wherein a side of the bass magnetic circuit system close to the bass vibration system is provided with a first bass magnetic gap, a second bass magnetic gap and a third bass magnetic gap spaced apart from each other; the first bass magnetic gap is provided around the treble magnetic gap and the first bass primary magnet; the second bass magnetic gap and the third bass magnetic gap are located on opposite sides of the first bass magnetic gap, respectively; the bass vibration system comprises a bass diaphragm fixed to the bass cone frame, a first bass voice coil, a second bass voice coil and a third bass voice coil; the first bass voice coil, the second bass voice coil and the third bass voice coil are spaced apart from each other, and are configured to drive the bass diaphragm to vibrate; the first bass voice coil is insertedly suspended in the first bass magnetic gap; the second bass voice coil is insertedly suspended in the second bass magnetic gap; and the third bass voice coil is insertedly suspended in the third bass magnetic gap.

5. The sound-generating device of claim 4, wherein the bass diaphragm comprises a first surround in a ring shape, a second surround in a ring shape and a vibration portion in a ring shape; the second surround is arranged spaced apart at an inner side of the first surround; an outer periphery of the first surround is fixed to the bass cone frame; an inner periphery of the second surround is fixed to the second ring magnet; an outer periphery of the vibration portion is fixed to an inner periphery of the first surround; an inner periphery of the vibration portion is fixed to an outer periphery of the second surround; and the first bass voice coil, the second bass voice coil and the third bass voice coil are fixed to a side of the vibration portion close to the bass magnetic circuit system.

6. The sound-generating device of claim 5, wherein the bass diaphragm further comprises a dome stackedly fixed to a side of the vibration portion away from the bass magnetic circuit system.

7. The sound-generating device of claim 4, wherein the bass vibration system further comprises an elastic member; one end of the elastic member is fixed to the bass cone frame, and the other end of the elastic member is fixed to a side of the vibration portion close to the bass magnetic circuit system; and the first bass voice coil, the second bass voice coil and the third bass voice coil are fixed to a side of the elastic member away from the vibration portion.

8. The sound-generating device of claim 4, wherein the bass magnetic circuit system further comprises a second bass primary magnet, a third bass primary magnet, a plurality of first bass secondary magnets, a plurality of second bass secondary magnets and a plurality of third bass secondary magnets; the second bass primary magnet and the third bass primary magnet are stackedly fixed to the side of the bass bottom plate close to the bass vibration system, and are located at opposite sides of the first bass primary magnet, respectively; the plurality of first bass secondary magnets are provided around the first bass primary magnet; the plurality of second bass secondary magnets are provided around the second bass primary magnet; the plurality of third bass secondary magnets are provided around the third bass primary magnet; the second bass primary magnet and the third bass primary magnet are spaced from the first bass primary magnet; the plurality of first bass secondary magnets are spaced from the first bass primary magnet to form the first bass magnetic gap; the plurality of second bass secondary magnets and some of the plurality of first bass secondary magnets are spaced from the second bass primary magnet to form the second bass magnetic gap; and the plurality of third bass secondary magnets and some of the plurality of first bass secondary magnets are spaced from the third bass primary magnet to form the third bass magnetic gap.

9. The sound-generating device of claim 8, wherein the bass magnetic circuit system further comprises a bass top plate; the bass top plate is stackedly fixed to a side of the plurality of first bass secondary magnets close to the bass vibration system, a side of the plurality of second bass secondary magnets close to the bass vibration system and a side of the plurality of third bass secondary magnets close to the bass vibration system.

10. The sound-generating device of claim 9, wherein the bass magnetic circuit system further comprises a bass pole core; and the bass pole core is fixed to a side of the second bass primary magnet close to the bass vibration system and a side of the third bass primary magnet close to the bass vibration system.

* * * * *